United States Patent
Oue et al.

(10) Patent No.: US 9,415,678 B2
(45) Date of Patent: Aug. 16, 2016

(54) TRANSPORT VEHICLE, AND TRANSPORT VEHICLE AIR CLEANER

(71) Applicant: Hitachi Construction Machinery Co., Ltd., Bunkyo-ku, Tokyo (JP)

(72) Inventors: Tsuyoshi Oue, Tsuchiura (JP); Naokazu Oda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/443,740

(22) PCT Filed: Nov. 20, 2012

(86) PCT No.: PCT/JP2012/080070
§ 371 (c)(1),
(2) Date: May 19, 2015

(87) PCT Pub. No.: WO2014/080452
PCT Pub. Date: May 30, 2014

(65) Prior Publication Data
US 2015/0321546 A1    Nov. 12, 2015

(51) Int. Cl.
*B60K 11/06*    (2006.01)
*B60P 1/04*    (2006.01)
(Continued)

(52) U.S. Cl.
CPC ............ *B60K 11/06* (2013.01); *B60K 7/0007* (2013.01); *B60P 1/04* (2013.01); *F01P 11/12* (2013.01); *H02K 9/04* (2013.01); *B60K 6/46* (2013.01); *B60K 2001/006* (2013.01); *B60Y 2200/142* (2013.01); *B60Y 2200/92* (2013.01); *Y10S 903/902* (2013.01)

(58) Field of Classification Search
CPC .. F02B 29/0443; B60K 11/06; B60K 7/0007; B60K 6/46; B60K 7/00
See application file for complete search history.

(56) References Cited

U.S. PATENT DOCUMENTS 4,218,223 A * 8/1980 Lidstone ............. F02M 35/022
                                       55/385.5
5,320,654 A    6/1994 Minami
(Continued)

FOREIGN PATENT DOCUMENTS

JP        2507606 Y2    8/1996
JP        11-241369 A    9/1999
(Continued)

OTHER PUBLICATIONS

Japanese Office Action issued in counterpart Japanese Application No. 2014-548353 dated Mar. 8, 2016 (three pages).
(Continued)

*Primary Examiner* — Hau Phan
(74) *Attorney, Agent, or Firm* — Crowell & Moring LLP

(57) ABSTRACT

Provided is a haulage vehicle having an air cleaner that is realistic from the viewpoints of fabrication steps and cost aspect. An air cleaner (24) arranged in a haulage vehicle is provided with a swirling flow generator (26), a separator (27) and an outer cylindrical casing (25). The swirling flow generator has a fixed shaft (28) and a plurality of guide blades (29) arranged and shifted from one another over a predetermined angle in a direction in which the guide blades rotate about the fixed shaft, and by the plurality of guide blades, a swirling flow of cooling air is generated. The separator has a flange (32) attached on and along an inner peripheral wall of the outer cylindrical casing (25), an inner cylindrical member (30) arranged on an outer edge of a center bore of the flange, and a collection pocket (31). Dust contained in the cooling air is taken by the swirling flow into a space between the inner cylindrical member and the outer cylindrical casing and is allowed to accumulate in the collection pocket.

4 Claims, 2 Drawing Sheets

(51) Int. Cl.
  *B60K 7/00* (2006.01)
  *F01P 11/12* (2006.01)
  *H02K 9/04* (2006.01)
  *B60K 6/46* (2007.10)
  *B60K 1/00* (2006.01)

(56) References Cited

U.S. PATENT DOCUMENTS

2006/0272621 A1* 12/2006 Acuna ............... F02B 29/0443
                                                   123/542

2008/0098998 A1* 5/2008 Dicke ................ F02B 29/0443
                                                   123/563

FOREIGN PATENT DOCUMENTS

| JP | 2002-324561 A | 11/2002 |
| JP | 2007-229913 A | 9/2007 |
| JP | 2010-156276 A | 7/2010 |
| JP | 2011-119670 A | 6/2011 |

OTHER PUBLICATIONS

International Search Report (PCT/ISA/210) dated Feb. 5, 2013 with English-language translation (four (4) pages).

* cited by examiner

TRANSPORT VEHICLE, AND TRANSPORT VEHICLE AIR CLEANER

TECHNICAL FIELD

This invention relates to a haulage vehicle such as a dump truck that hauls, for example, minerals and the like excavated at a mine or the like, and also to an air cleaner suitable for the haulage vehicle.

BACKGROUND ART

At an excavation site, a mine or the like for open-pit mining, work is generally performed including excavating a large amount of minerals and earth or sand by hydraulic excavators and loading a large amount of excavated minerals (crushed stones) and the like on large-sized haulage vehicles called "dump trucks" to haul them to an unloading site such as a port.

A large-sized dump truck that adopts an AC drive traction system drives a generator by an engine, and subsequent to control of the resulting electricity by an inverter, drives AC motors to perform traveling. As the generator produces heat as an energy loss due to the electric resistances of its parts and coils, there is a need to forcedly supply cooling air into the generator to perform cooling of the generator.

At a mine where large-sized dump trucks are in operation, impurities (hereinafter called "dust") such as sand are contained abundantly in the atmosphere because of dust arisen by loaders and forerunning dump trucks. If dust-containing air is directly taken into a generator, a potential problem may therefore arise in that insulating coatings in the generator may be worn out by dust and the insulation resistance may be lowered. If the use of the generator is continued with its insulating coatings having been worn out, a potential problem may arise in that the wearing may proceed to complete loss of the insulating coatings, coils may eventually undergo dielectric breakdown, and a rotor may become no longer usable.

For the prolongation of the service life of such a generator, the removal of dust from cooling air is considered to be the most effective measure. However, a dust collector equipped with a filter requires scheduled maintenance, and moreover is accompanied by a concern about a possible reduction in cooling performance through the clogging of the filter.

As a technology that can remove dust from air without using any filter, Patent Document 1 is publicly known, for example. Patent Document 1 discloses a configuration that in a cooling unit for a drive system of a large-sized dump truck, strata tubes are parallelly arranged in an air cleaner that is disposed in an inlet part of the cooling unit. According to Patent Document 1, dust can be removed from cooling air by introducing the cooling air into the strata tubes and producing swirling flows in the strata tubes.

PRIOR ART DOCUMENT

Patent Document

Patent Document 1: JP-B-2507606(U)

DISCLOSURE OF THE INVENTION

Problem to be Solved by the Invention

However, the cooling unit of Patent Document 1 includes a large number of components. It is, therefore, not considered easy to assemble this cooling unit in a cooling system of a haulage vehicle such as a dump truck. Further, the air cleaner, which the cooling unit of Patent Document 1 is provided with, uses helical blades in the strata tubes, so that it needs many fabrication steps and also high fabrication cost. It is, accordingly, not considered realistic to include the cooling unit of Patent Document 1 in a cooling system of a haulage vehicle such as a dump truck.

With the above-mentioned circumstances in view, the present invention has as an object thereof the provision of a haulage vehicle with a cooling air supply assembly mounted thereon, which is provided with an air cleaner that is realistic from the viewpoints of fabrication steps and cost aspect. Further, it is another object of the present invention to provide such an air cleaner itself.

Means for Solving the Problem

To achieve the above-described objects, a haulage vehicle according to the present invention includes a vehicle body provided with a load body on which a material to be hauled can be loaded, an engine mounted on the vehicle body, an alternator drivable by the engine to perform power generation, a travel electric motor to be supplied with driving electric power based on the power generation by the alternator, and a cooling air supply assembly for supplying cooling air to the alternator and electric motor. The cooling air supply assembly is configured having two cooling fans for drawing cooling air, an alternator-side duct for allowing the cooling air, which has been drawn by one of the cooling fans, to flow toward the alternator, an electric motor-side duct for allowing the cooling air, which has been drawn by the other cooling fan, to flow toward the electric motor, and an air cleaner for removing dust from the cooling air drawn by one of the cooling fans. The air cleaner has a swirling flow generator for generating a swirling flow of the cooling air taken into the air cleaner, a separator arranged on a side downstream of the swirling flow generator to separate dust from the cooling air, and an outer cylindrical casing with the swirling flow generator and separator accommodated therein. The swirling flow generator has a fixed shaft disposed on and along a central axis of the outer cylindrical casing, and a plurality of guide blades attached at one ends thereof to the fixed shaft and at opposite ends thereof to the outer cylindrical casing and arranged and shifted from one another over a predetermined angle in a direction in which the guide blades rotate about the fixed shaft, whereby by the plurality of guide blades, the swirling flow of the cooling air is generated in a direction of the central axis of the outer cylindrical casing. The separator has a flange attached on and along an inner peripheral wall of the outer cylindrical casing, an inner cylindrical member arranged extending from an outer edge of a center bore of the flange toward an upstream side as viewed in the direction of the central axis of the outer cylindrical casing, and a collection pocket disposed at a position of the outer cylindrical casing, where the outer cylindrical casing faces the inner cylindrical member. It is configured that the dust contained in the cooling air, which has been drawn by the one of the cooling fans, is taken by the swirling flow into a space between the inner cylindrical member and the outer cylindrical casing and is allowed to accumulate in the collection pocket.

According to the present invention, the configuration of the air cleaner is simpler compared with before. In particular, the plurality of guide blades, which constitute the swirling flow generator, have a simple configuration that they are only attached to the fixed shaft and outer cylindrical casing while being shifted from one another over the predetermined angle about the fixed shaft. It is, therefore, possible to make fewer the fabrication steps of the air cleaner and to reduce its fabrication cost. In other words, the present invention has made it possible to provide a haulage vehicle with a cooling air supply assembly mounted thereon, which is provided with an air cleaner that is realistic from the viewpoints of fabrication steps and cost aspect.

In the above-described configuration, the air cleaner may preferably have a unit structure with the swirling flow generator and the separator each attached as few as one to the outer cylindrical casing, because this configuration facilitates the attachment and detachment of the air cleaner.

In the above-described configuration, the cooling air supply assembly can be configured to cool the alternator by blowing the cooling air, which has been delivered from the alternator-side duct, directly against the alternator but to cool the electric motor by blowing the cooling air, which has been delivered from the electric motor-side duct, indirectly against the electric motor; and the air cleaner can be formed with substantially the same outer diameter as that of the alternator-side duct, and can be assembled in the alternator-side duct such that the air cleaner and the alternator-side duct have coincident central axes.

On the other hand, in the above-described configuration, the cooling air supply assembly can be configured to cool the electric motor by blowing the cooling air, which has been delivered from the electric motor-side duct, directly against the electric motor but to cool the alternator by blowing the cooling air, which has been delivered from the alternator-side duct, indirectly against the alternator; and the air cleaner can be formed with substantially the same outer diameter as that of the electric motor-side duct, and can be assembled in the electric motor-side duct such that the air cleaner and the electric motor-side duct have coincident central axes.

If cooling air is blown directly against an object to be cooled (the alternator or electric motor), the cooled object is susceptible to damage by dust. According to the above-described configuration, however, the air cleaner is arranged in the duct that delivers cooling air to the cooled object against which the cooling air is blown directly (the alternator-side duct or the electric motor-side duct) so that such damage can be avoided. In addition, the air cleaner is arranged only in the duct through which cooling air is blown directly against the cooled object. The arrangement of air cleaner(s) can, therefore, be limited to that minimally necessary, thereby making it possible to achieve still further reductions in the number of components and cost. Moreover, the outer diameter of the air cleaner and that of its associated duct are substantially the same, so that upon assembly of the air cleaner in the duct, they can be brought into a unitary configuration as viewed externally.

Also to achieve the another object described above, an air cleaner according to the present invention for a haulage vehicle has a swirling flow generator for generating a swirling flow of cooling air taken from an outside, a separator arranged on a side downstream of the swirling flow generator to separate dust from the cooling air, and an outer cylindrical casing with the swirling flow generator and separator accommodated therein. The swirling flow generator has a fixed shaft disposed on and along a central axis of the outer cylindrical casing, and a plurality of guide blades attached at one ends thereof to the fixed shaft and at opposite ends thereof to the outer cylindrical casing and arranged and shifted from one another over a predetermined angle in a direction in which the guide blades rotate about the fixed shaft, whereby by the plurality of guide blades, the swirling flow of the cooling air is generated in a direction of the central axis of the outer cylindrical casing. The separator has a flange attached on and along an inner peripheral wall of the outer cylindrical casing, an inner cylindrical member arranged extending from an outer edge of a center bore of the flange toward an upstream side as viewed in the direction of the central axis of the outer cylindrical casing, and a collection pocket disposed at a position of the outer cylindrical casing, where the outer cylindrical casing faces the inner cylindrical member. It is configured that the dust contained in the cooling air is taken by the swirling flow into a space between the inner cylindrical member and the outer cylindrical casing and is allowed to accumulate in the collection pocket. According to this invention, it is possible to reduce a pressure loss when cooling air flows. Of course, this invention can make the fabrication steps fewer and can reduce cost.

Advantageous Effects of the Invention

Owing to the inclusion of the above-described configurations, the present invention can provide a haulage vehicle with a cooling air supply assembly mounted thereon, which is provided with an air cleaner that is realistic from the viewpoints of fabrication steps and cost aspect. According to the present invention, it is also possible to provide an air cleaner that is realistic and suited for being mounted on a haulage vehicle.

MODE FOR CARRYING OUT THE INVENTION

Taking, as an example, a dump truck for hauling crushed stones (minerals) excavated at a mine or the like, a haulage vehicle according to an embodiment of the present invention will hereinafter be described with reference to the drawings.

Figure 1:
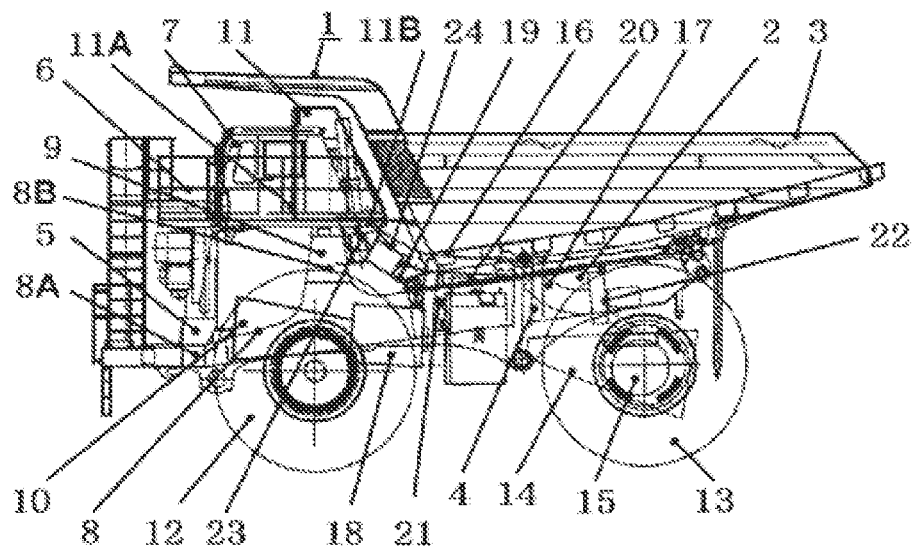
FIG. 1 is a side view showing a dump truck according to an embodiment of the present invention.

In FIG. 1, numeral 1 designates a dump truck as a large-sized haulage vehicle, and the dump truck 1 is substantially configured of a vehicle body 2 in the form of a solid frame structure, and a load body (vessel) 3 mounted on the vehicle body 2 to load therein a large amount of heavy materials to be hauled, such as, crushed stones. On the other hand, the vehicle body 2 is configured including a frame 4, a housing 5, a deck 6 and a cab 7, and the like. These frame 4, housing 5, deck 6 and cab 7 will be described subsequently herein.

The frame 4 serves as a base for the vehicle body 2, and is formed as a rigid support structure body having a plate working structure. The frame 4 is substantially configured by a base frame 8 extending in a front-rear direction and an upper cross beam 9 arranged at an intermediate part of the base frame 8 as viewed in a front-rear direction of the base frame 8.

Configured in the base frame 8 are left and right leg parts 8A (only the left one is shown) and left and right support parts 8B (only the left one is shown). The left and right leg parts 8A extend forward and flare in the form of a fork (in a V-form or U-form), while the left and right support parts 8B extend upward from intermediate positions of the respective leg parts as viewed in a length direction (the front-rear direction) of the leg parts. Arranged between the left and right leg parts (only the left leg part 8A is shown) is an engine to be described subsequently herein.

Numeral 9 designates the upper cross beam that makes up the frame 4 in combination with the base frame 8. The upper cross beam 9 is formed in a hollow, square prismatic shape and extends in the left-right direction, and is secured to upper end portions of the left and right support parts (only the left support part 8B is shown) which constitute the base frame 8. Further, the upper cross beam 9 extends out in the left-right direction from the respective support parts 8B of the base frame 8, and supports the deck 6, the cab 7, a control cabinet 11 and the like from a lower side. These deck 6, cab 7 and control cabinet 11 will be described subsequently herein.

Next, designated at numeral 12 are left and right front wheels rotatably arranged on the side of a front section of the vehicle body 2, and the respective front wheels 12 serve as steered wheels which are steered (subjected to steering) by an operator of the dump truck 1. Similar to rear wheels 13 to be described subsequently herein, the left and right front wheels 12 are formed with a tire diameter (outer diameter dimension), for example, as large as 2 to 4 meters.

Numeral 13 designates the left and right wheels rotatably arranged on the side of a rear section of the vehicle body 2. The respective, left and right rear wheels 13 serve as traction wheels for the dump truck 1, and are rotatably supported on a rear axle housing 14 to be described subsequently herein. The rear wheels 13 are driven and rotated by electric motors 15, respectively. These electric motors 15 are accommodated in the rear axle housing 14, and will be described subsequently herein.

Numeral 14 designates the rear axle housing arranged on a lower side of the rear section of the vehicle body 2, and the rear axle housing 14 is formed as a cylindrical body that extends in the direction of an axle between the left and right rear wheels 13 (in a lateral direction of the vehicle body 2).

The electric motors 15, which will be described subsequently herein, are accommodated in a pair in the rear axle housing 14 to drive and rotate the left and right rear wheels 13 individually. Rotation of an output shaft of each electric motor 15 is made low in speed and large in torque through a gear reduction mechanism (not shown) or the like, and is then transmitted to the corresponding rear wheel 13. An electric motor-side duct 17 of a cooling air supply assembly 16, which will be described subsequently herein, is connected to an intermediate part of the rear axle housing 14 as viewed in the direction of the axle, and is configured to indirectly cool the respective electric motors 15 with cooling air supplied through the electric motor-side duct 17.

Numeral 5 designates the housing, which makes up a part of the vehicle body 2, is located on a forward side of the support parts 8B, and is secured to the left and right leg parts (only the left leg part 8A is shown). The housing 5 supports the below-described deck 6 from a lower side in cooperation with the upper cross beam 9.

Numeral 6 designates the deck disposed on an upper side of the housing 5. The deck 6 is arranged at a position above the front wheels 12, and forms a flat walking surface or the like on an upper side of the front section (the housing 5) of the vehicle body 2. The cab 7, which will be described subsequently herein, or the like is disposed on the deck 6.

Numeral 7 designates the cab, which is positioned forward of a front wall of the load body 3 and is disposed on a left side of a top part of the vehicle body 2. The cab 7 is disposed on the deck 6, and is supported from a lower side by the upper cross beam 9 of the frame 4 and the housing 5.

Numeral 10 designates the engine, which is positioned on a lower side of the upper cross beam 9 of the frame 4 and is mounted on the vehicle body 2. The engine 10 is configured using, for example, a large-sized diesel engine or the like, and drives an alternator 18 to be described subsequently herein.

Numeral 18 designates the alternator that is driven by the engine 10. The alternator 18 serves to generate driving electric power that is to be outputted to the electric motors 15 to be described subsequently herein, and generates, for example, three-phase alternating power of 1500 kW or so. An alternator-side duct 19 of the cooling air supply assembly 16, which is to be described subsequently herein, is connected to the alternator 18, and is configured to directly cool the alternator 18 with cooling air supplied through the alternator-side duct 19.

Numeral 15 designates the paired travel electric motors arranged in the rear axle housing 14. These respective electric motors 15 are each configured by a large-sized electric motor that consists, for example, of a three-phase induction electric motor, a three-phase brushless DC electric motor or the like, and drive and rotate the left and right rear wheels 13 independently from each other. Here, it is to be noted that each electric motor 15 is supplied with driving electric power based on the power generation by the alternator 18 and that a rotating shaft of each electric motor 15 is rotated by the supply of the driving electric power. It is configured that the rotation of the rotating shafts of the respective electric motors 15 is transmitted to the corresponding rear wheels 13 via unillustrated gear reduction mechanisms or the like and the dump truck 1 travels by rotation of the respective rear wheels 13.

Numeral 11 designates the control cabinet arranged centrally on a top part of the vehicle body 2 and located side by side on a right side of the cab 7. The control cabinet 11 is supported from a lower side by the upper cross beam 9 of the frame 4. Accommodated in the control cabinet 11 are an inverter for controlling the travel electric motors 15, a control board for controlling an electric current to be generated by the alternator 18 and the rotational speed of the engine 10, a radiator for cooling coolant for the inverter, and the like.

It is to be noted that the control cabinet 11 serves to accommodate the inverter and control board, and in addition makes up a passage for supplying cooling air to the cooling air supply assembly 16 to be described subsequently herein. A cooling air inlet port 11A, through which outside air is taken into as cooling air, is hence arranged opening through a front wall of the control cabinet 11. A cooling air outlet port 11B, through which the cooling air taken into the control cabinet 11 flows out (which serves as an outlet for cooling air), is arranged opening through a bottom part of the control cabinet 11.

Figure 2:
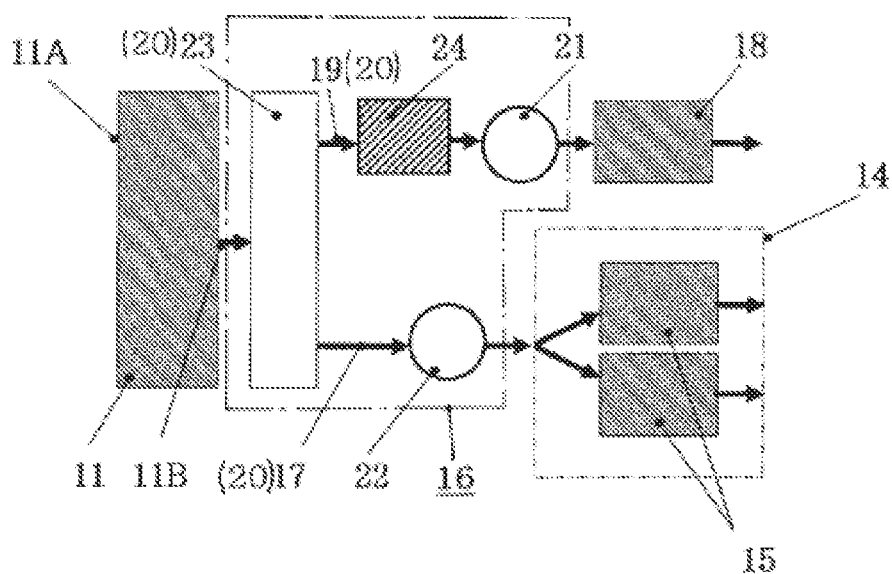
FIG. 2 is a simplified configuration diagram of a cooling system in the dump truck according to the embodiment of the present invention.
Figure 3:
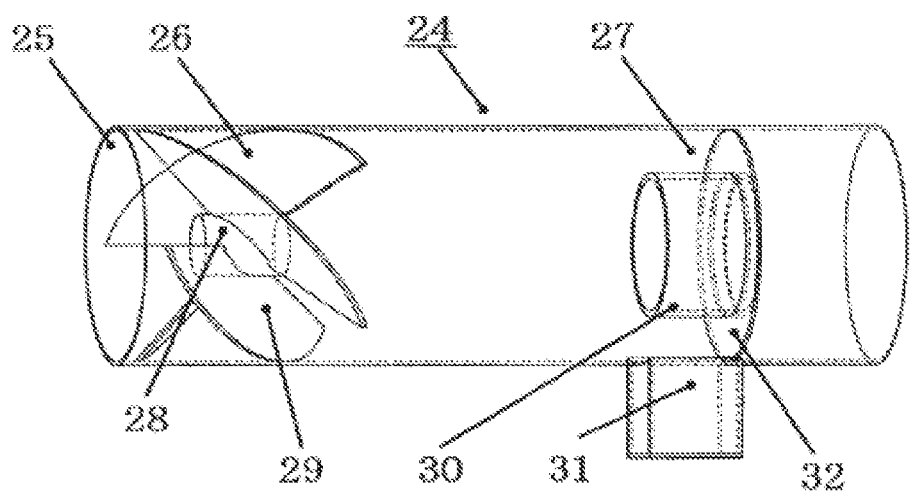
FIG. 3 is a side view of an air cleaner according to the present invention.

With reference to FIG. 2 and FIG. 3, a description will next be made about the alternator 18, which produces heat during operation of the dump truck 1, and the cooling water supply assembly 16 for cooling the travel electric motors 15.

In FIG. 2, numeral 16 designates the cooling air supply assembly that supplies cooling air to the alternator 18 and the travel electric motors 15, both of which are objects to be cooled. The cooling air supply assembly 16 takes thereinto as cooling air the outside air which has flowed in through the cooling air inlet port 11A of the control cabinet 11 and has flowed out from the cooling air outlet port 11B of the control cabinet 11, and then supplies the cooling air to the alternator 18 and electric motor 15, whereby these alternator 18 and electric motor 15 are cooled. It is to be noted that the cooling air supply assembly 16 is substantially configured by a cooling air supply channel 20 through which cooling air is allowed to flow, an air cleaner 24 for removing dust from cooling air, an alternator-side cooling fan (cooling fan) 21, and an electric motor-side cooling fan (cooling fan) 22.

The cooling air supply channel 20 is configured including a header box 23, the alternator-side duct 19 and the electric motor-side duct 17. The header box 23 takes, thereinto, cooling air that has flowed out of the cooling air outlet port 11B provided at the control cabinet 11. The alternator-side duct 19 is cylindrical, and branches out from the header box 23 to guide cooling air to the alternator 18. The electric motor-side duct 17 is cylindrical, and also branches out from the header box 23 to guide cooling air to the electric motor 15.

The header box (plenum box) 23 is secured with fastening elements (not shown) such as bolts on a lower wall of the control cabinet 11, and is in communication with the cooling air outlet port 11B of the control cabinet 11. As the alternator-side duct 19 is provided with the alternator-side fan 21, the cooling air that has flowed into the header box 23 is allowed to flow into the alternator-side duct 19 by the alternator-side fan 21. On the other hand, the electric motor-side duct 17 is provided with the electric motor-side cooling fan 22 so that the cooling air, which has flowed into the header box 23, is also allowed to flow into the electric motor-side duct 17 by the electric motor-side cooling fan 22. The cooling air that has flowed into the header box 23 is, therefore, divided to flow into the alternator-side duct 19 and the electric motor-side duct 17.

Owing to the shape of the cooling air supply channel 20 and the layout of the alternator 18 and electric motors 15, the cooling air supply assembly 16 in this embodiment is configured such that the cooling air supplied into the alternator 18 directly hits its stator and rotor coils (now shown) but the cooling air supplied into the rear axle housing 14 does not hit the electric motors 15 directly.

As is appreciated from the foregoing, this embodiment has taken a measure to protect the insulating coatings of the stator and rotor coils of the alternator 18 from wearing with dust contained in cooling air by arranging the air cleaner 24 in the alternator-side duct 19. On the other hand, the electric motor-side duct is provided with no air cleaner 24 because of the low possibility of occurrence of the wearing problem of insulating coatings, since the cooling air supplied into the rear axle housing 14 does not hit the electric motors 15 directly.

The air cleaner 24 is arranged at an intermediate position of the alternator-side duct 19, more specifically between the header box 23 and the alternator-side cooling fan 21. This air cleaner 24 serves to allow cooling air to flow in a helical pattern (to swirl) so that dust such as fine sand and powder dust mixed in the cooling air is centrifugally separated from the cooling air. It is to be noted that as shown in FIG. 3, the air cleaner 24 is substantially configured by an outer cylindrical casing 25, a swirling flow generator 26, a separator 27, and the like. Described specifically, the air cleaner 24 has a unit structure with the swirling flow generator 26 and the separator 27 each attached as few as one to the outer cylindrical casing 25.

The outer cylindrical casing 25 is a cylindrical member that makes up an outer shell of the air cleaner 24, and is arranged with its central axis lying on the same axis as the central axis of the alternator-side duct 19 such that it extends in a direction toward the cooling air outlet of the header box 23. Further, the diameter of the outer cylindrical casing 25 and that of the alternator-side duct 19 are substantially the same. Accordingly, the assembly of the air cleaner 24 in the alternator-side duct 19 brings the alternator-side duct 19 and the outer cylindrical casing 25 into a unitary configuration as viewed externally. The outer cylindrical casing 25 is provided on an upstream side of cooling air with the swirling flow generator 26 and on a downstream side of cooling air with the separator 27.

The swirling flow generator 26 serves to generate a swirling flow of cooling air about its central axis, and is configured having a fixed shaft 28 and a plurality (for example, four) of guide blades 29. The fixed shaft 28 is in the form of a round rod with a central axis thereof being arranged on and along the same axis as the central axis of the alternator-side duct 19 (in other words, on and along the central axis of the outer cylindrical casing 25). The guide blades 29 are attached at one ends thereof to the fixed shaft 28 and at opposite ends thereof to the outer cylindrical casing 25, and are arranged and shifted from one another over a predetermined angle in a direction in which the guide blades 29 rotate about the fixed shaft 28.

Making use of their own inclinations, the guide blades 29 serve to produce a swirling flow of cooling air, which has linearly flowed in (which has flowed in along the central axis of the outer cylindrical casing 25), in a direction of the central axis of the outer cylindrical casing 25. It is to be noted that each guide blade 29 has a flat sectoral shape (in the shape of a substantially quadrant of a circle).

The separator 27 has a flange 32 attached on and along an inner peripheral wall of the outer cylindrical casing 25, an inner cylindrical member 30 arranged extending from an outer edge of a center bore of the flange 32 toward an upstream side as viewed in the direction of the central axis of the outer cylindrical casing 25, and a collection pocket 31 disposed at a position of the outer cylindrical casing 25, where the outer cylindrical casing 25 faces the inner cylindrical member 30. Further, a predetermined space is formed between the outer cylindrical casing 25 and the inner cylindrical member 30.

Dust contained in cooling air is taken into the space between the inner cylindrical member 30 and the outer cylindrical casing 25 while being forced outward in a radial direction under centrifugal force produced by the swirling flow. The dust, which has entered the space, is prevented from moving toward a downstream side by the flange 32, and is allowed to eventually accumulate in the collection pocket 31.

In the manner described above, the cooling air from which dust has been removed by the air cleaner 24 is allowed to flow through the inside of the inner cylindrical member 30, is supplied to the alternator 18, and therefore can cool the alternator 18. The collision of dust against the alternator 18 can be reduced by the air cleaner 24, so that the durability of the alternator 18 is assured. Further, the air cleaner 24 is free of any concern about clogging unlike a filter because the air cleaner 24 has the configuration that a swirling flow is generated for the centrifugal removal of dust. It is, therefore, possible to achieve both the removal of dust from cooling air and the assurance of a sufficient amount of cooling air.

In addition, the guide blades 29 applied to the air cleaner 24 have the relatively simple sectoral shape, and compared with the fabrication of such a helical blade as in the past, the fabrication steps can be made fewer and the fabrication cost can be lowered significantly.

It is to be noted that in the above-described embodiment, the air cleaner 24 is arranged in only the alternator-side duct 19 because the above-described embodiment has the configuration that cooling air directly hits the alternator 18 but cooling air indirectly hits the electric motors 15. When it is configured such that cooling air directly hits the electric motors 15 but cooling air indirectly hits the alternator 18, on the other hand, it is only necessary to provide only the electric motor-side duct 17 with the air cleaner 24. Needless to say, the air cleaner 24 can be used in a cooling system for the entirety of a haulage vehicle instead of arranging it in the cooling system of the dump truck 1.

LEGENDS

1 Dump truck (haulage vehicle)
2 Vehicle body
3 Load body
10 Engine
15 Electric motor
16 Cooling air supply assembly
17 Electric motor side duct
18 Alternator
19 Alternator side duct
21 Alternator side cooling fan (cooling fan)
22 Electric motor side cooling fan (cooling fan)
24 Air cleaner
25 Outer cylindrical casing
26 Swirling flow generator
27 Separator
28 Fixed shaft
29 Guide blade
30 Inner cylindrical member
31 Collection pocket
32 Flange

The invention claimed is:

1. A haulage vehicle including a vehicle body provided with a load body on which a material to be hauled can be loaded, an engine mounted on the vehicle body, an alternator drivable by the engine to perform power generation, a travel electric motor to be supplied with driving electric power based on the power generation by the alternator, and a cooling air supply assembly for supplying cooling air to the alternator and electric motor, wherein:

the cooling air supply assembly is configured having two cooling fans for drawing cooling air, an alternator-side duct for allowing the cooling air, which has been drawn by one of the cooling fans, to flow toward the alternator, an electric motor-side duct for allowing the cooling air, which has been drawn by the other cooling fan, to flow toward the electric motor, and an air cleaner for removing dust from the cooling air drawn by one of the cooling fans;

the air cleaner has a swirling flow generator for generating a swirling flow of the cooling air taken into the air cleaner, a separator arranged on a side downstream of the swirling flow generator to separate dust from the cooling air, and an outer cylindrical casing with the swirling flow generator and separator accommodated therein;

the swirling flow generator has a fixed shaft disposed on and along a central axis of the outer cylindrical casing, and a plurality of guide blades attached at one ends thereof to the fixed shaft and at opposite ends thereof to the outer cylindrical casing and arranged and shifted from one another over a predetermined angle in a direction in which the guide blades rotate about the fixed shaft, whereby by the plurality of guide blades, the swirling flow of the cooling air is generated in a direction of the central axis of the outer cylindrical casing;

the separator has a flange attached on and along an inner peripheral wall of the outer cylindrical casing, an inner cylindrical member arranged extending from an outer edge of a center bore of the flange toward an upstream side as viewed in the direction of the central axis of the outer cylindrical casing, and a collection pocket disposed at a position of the outer cylindrical casing, where the outer cylindrical casing faces the inner cylindrical member; and the dust contained in the cooling air, which has been drawn by the one of the cooling fans, is taken by the swirling flow into a space between the inner cylindrical member and the outer cylindrical casing and is allowed to accumulate in the collection pocket.

2. The haulage vehicle according to claim 1, wherein:
the air cleaner has a unit structure with the swirling flow generator and the separator each attached as few as one to the outer cylindrical casing.

3. The haulage vehicle according to claim 2, wherein:
the cooling air supply assembly is configured to cool the alternator by blowing the cooling air, which has been delivered from the alternator-side duct, directly against the alternator but to cool the electric motor by blowing the cooling air, which has been delivered from the electric motor-side duct, indirectly against the electric motor; and the air cleaner is formed with substantially the same outer diameter as that of the alternator-side duct, and is assembled in the alternator-side duct such that the air cleaner and the alternator-side duct have coincident central axes.

4. The haulage vehicle according to claim 2, wherein:
the cooling air supply assembly is configured to cool the electric motor by blowing the cooling air, which has been delivered from the electric motor-side duct, directly against the electric motor but to cool the alternator by blowing the cooling air, which has been delivered from the alternator-side duct, indirectly against the alternator; and the air cleaner is formed with substantially the same outer diameter as that of the electric motor-side duct, and is assembled in the electric motor-side duct such that the air cleaner and the electric motor-side duct have coincident central axes.

* * * * *